3,117,117
DYESTUFFS CAPABLE OF REACTION WITH TEXTILE FIBERS HAVING ACYLATABLE HYDROGEN ATOMS
Alistair Howard Berrie and Gerald Booth, Manchester, England, assignors to Imperial Chemical Industries Limited, London, England, a corporation of Great Britain
No Drawing. Filed Sept. 7, 1960, Ser. No. 54,354
Claims priority, application Great Britain Sept. 16, 1959
2 Claims. (Cl. 260—162)

This invention relates to new dyestuffs and more particularly it relates to new dyestuffs which are capable of entering into reaction with textile fibres containing acylatable hydrogen atoms, such as textile materials comprising natural and regenerated cellulose, wool, silk and superpolyamide fibres.

The present invention provides new dyestuffs capable of reacting with such fibres by virtue of the presence of a halogenobenzenesulphonamido or halogenobenzenecarbonamido group in which the halogen atom is activated by presence of a nitro group.

According to the invention there are provided the new dyestuffs of the formula:

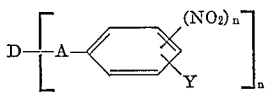

wherein D represents the residue of a coloured compound which contains one or two primary or secondary amino groups and which is linked to A through the nitrogen atom of the amino group or groups, —A— represents —CO— or —$SO_2$—, Y represents a halogen atom, $m$ represents 1 or 2 and $n$ represents 1 or 2.

As examples of the halogen atoms represented by Y there may be mentioned fluorine, bromine and preferably chlorine atoms.

The residues of the coloured compounds represented by D which contain one or two primary or secondary amino groups may be the residues of any dyestuff series which contains one or two primary or secondary amino groups, but preferably they are residues of dyestuffs of the azo, which may be monoazo or polyazo, nitro, anthraquinone or phthalocyanine series which contain one or two primary or secondary amino groups, and which may or may not contain coordinately bound metal such as coordinately bound chromium, copper, cobalt or nickel. It is preferred that the residues of the coloured compounds represented by D also contain at least one water-solubilising group such as carboxylic acid, alkylsulphonamide, sulphonamide and preferably a sulphonic acid group.

According to a further feature of the invention there is provided a process for the manufacture of the new dyestuffs, as hereinbefore defined, which comprises treating a dyestuff compound of the formula: D—H, wherein D has the meaning stated, above, with an acid halide of the formula:

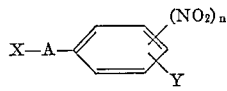

wherein A, $n$ and Y have the meanings stated above and X represents a chlorine or a bromine atom.

The process of the invention may be conveniently carried out by stirring the dyestuff compound and the acid halide together in water or in an organic liquid or in a mixture of water and an organic liquid, preferably in the presence of an acid-binding agent such as sodium carbonate or pyridine, and at a temperature between 0° and 100° C., and filtering off the dyestuff which is precipitated. If desired sodium chloride or an organic liquid in which the dyestuff is insoluble can be added to ensure complete precipitation of all the dyestuff.

As examples of acid halides which may be used in this process of the invention there may be mentioned 4-chloro-3-nitrobenzene sulphonchloride, 4-chloro-3:5-dinitrobenzene sulphonchloride, 2-chloro-5-nitrobenzene sulphonchloride, 2-chloro-5-nitrobenzoylchloride, 2-bromo-5-nitrobenzene sulphonchloride, 4-bromo-3-nitrobenzene sulphonchloride, 4-bromo-3-nitrobenzene sulphonchloride and 2-bromo-5-nitrobenzoylchloride.

The dyestuff compounds of the azo series containing one or two primary or secondary amino groups which may be used as starting materials in the above process may be obtained by a variety of methods. One method is to diazotise an aromatic primary amine and couple the diazonium compound so obtained with a coupling component containing a primary or secondary amino group which after the coupling operation remains free to react with the acid halide. As examples of such aromatic primary amines which may be used in this manner to obtain the aminoazo compounds there may be mentioned aniline, o-, m- and p-toluidines, o-, m- and p-anisidines, o-, m- and p-chloroanilines, 2:5-dichloroaniline, α- and β-naphthylamine, 2:5-dimethylaniline, 5-nitro-2-aminoanisole, 4-aminodiphenyl, aniline-2-, 3- and 4-carboxylic acids, 2-aminodiphenylether, 2-, 3- or 4-aminobenzene sulphonamide or sulphonmonomethyl- or ethyl amides or sulphon-di-methyl- or -ethyl-amides, dehydrothio-p-toluidine monosulphonic acid or dehydrothio-p-toluidine disulphonic acid, aniline-2-, 3-3 and -4-sulphonic acids, aniline-2:5-disulphonic acid, 2:4-dimethylaniline-6-sulphonic acid, 3-aminobenzotrifluoride-4-sulphonic acid, 4-chloro-5-methyl aniline-2-sulphonic acid, 5-chloro-4-methylaniline-2-sulphonic acid, 3-acetylaminoaniline-6-sulphonic acid, 4-acetylaminoaniline-2-sulphonic acid, 4-chloroaniline-2-sulphonic acid, 3:4-dichloroaniline-6-sulphonic acid, 4-methylaniline-2-sulphonic acid, 3-methylaniline-6-sulphonic acid, 2:4-dimethoxyaniline-6-sulphonic acid, 4-methoxyaniline-2-sulphonic acid and 5-methoxyaniline-2-sulphonic acid, 2:5-dichloroaniline-4-sulphonic acid, 2-naphthylamine-4:8- and 6:8-disulphonic acids, 1-naphthylamine-2-, 4-, 5-, 6- or 7-monosulphonic acid, 1-naphthylamine-3:6-disulphonic acid, 2-naphthylamine-3:6- and 5:7-disulphonic acids and 2-naphthylamine-3:6:8-trisulphonic acid, m- and p-nitroaniline, 4-nitro-aniline-2-sulphonic acid and 3-nitroaniline-6-sulphonic acid, M- or p-aminoacetanilide, 4-amino-2-acetylaminotoluene-5-sulphonic acid.

As examples of coupling components there may be mentioned 2-amino- and 2-methylamino-5-naphthol-7-sulphonic acids, 2-amino- and 2-methylamino-8-naphthol-6-sulphonic acids, 1-amino- and 1-ethylamino-8-naphthol-6-sulphonic acids and the corresponding 3:6- and 4:6-disulphonic acids, 1-(3'- or -4'-aminobenzoylamino)-8-naphthol-3:6- and 4:6-disulphonic acids, aniline, o- and m-anisidines, o- and m-toluidines, 2:5-dimethylaniline, 3-amino-4-methoxytoluene, 2:5-dimethoxyaniline, N-methylaniline, N-ethyl-o-toluidine, N-methyl-m-anisidine, 3-methylamino-4-methoxytoluene, 1-(3'-aminophenyl)-3-methyl-, carboxy, and carboethoxy-5-pyrazolones, 1-(4'-aminophenyl)-3-methyl-, carboxy-, and carboethoxy-5-pyrazolones and 1-(4'-amino-3'-carboxyphenyl)-3-methyl-5-pyrazolone.

The dyestuff compounds of the azo series used in the process of the invention are not restricted to compounds containing only one azo group. Disazo compounds which may be used may be obtained for example by tetrazotisation of an aromatic diamine containing two primary amino groups and coupling the tetrazo compound so obtained with 2 molecular proportions of one of the above-defined coupling components or with 1 molecular proportion of each of two of the above-defined coupling components or with one molecular proportion of one of the above-defined coupling components and with one molecular proportion of a coupling component not containing an amino group. As examples of such aromatic diamines there may be mentioned benzidine, 3:3'-dimethoxybenzidine, benzidine-2:2'-disulphonic acid, benzidine-3:3'-dicarboxylic acid, benzidine-3:3'-diglycollic acid and 4:4'-diaminostilbene-2:2'-disulphonic acid.

Alternatively disazo or polyazo compounds may be obtained by the use of primary aromatic amines or diamines containing azo groups in the above-described processes. As examples of primary aromatic amines or diamines containing azo groups which may be used there may be mentioned 4-aminoazobenzene-4'-sulphonic acid, 4'-amino - 2' - methylphenylazo-2-naphthalene-4:8-disulphonic acid and 4 - amino-3-methoxy-2-methyl-4'-nitro-2'-sulphoazobenzene.

A similar method of obtaining the dyestuff compounds of the azo series which may be used as starting materials comprises coupling a coupling component which optionally contains a primary or secondary amino group with a diazonium compound which contains a primary or secondary amino group. Such diazonium compounds may be obtained by methods known from the art, by the diazotisation of aromatic primary amines containing a second amino group or containing a secondary amino group. As examples of such aromatic primary amines there may be mentioned p-phenylene diamine, 1:4-phenylene diamine - 2 - sulphonic acid, 1:4-phenylene diamine-2-carboxylic acid and 1:4-diamino-naphthalene - 2 - sulphonic acid. As examples of coupling components which may be used in this manner there may be mentioned the coupling components listed above and also β-naphthol, 2-naphthol-6- or -7-sulphonic acid, 2-naphthol-3:6- or 6:8-disulphonic acids, 1 - naphthol - 4-sulphonic acid, 1-phenyl - 3 - methyl-5-pyrazolone, 1:4'-sulphophenyl-3-methyl-5 - pyrazolone, 1 - (2':5' - dichloro - 4' - sulphophenyl)-3-methyl - 5 - pyrazolone, 2-benzoylamino-5-naphthol-7-sulphonic acid, 1-benzylamino-8-naphthol-3:6- or 4:6-disulphonic acid, phenol, p-cresol, acetoacetanilide and acetoacet-2-methoxyanilide-5-sulphonic acid.

A further method of obtaining the dyestuff compounds of the azo series which may be used as starting materials is to treat an azo or polyazo compound containing one or two acylamino groups with aqueous acid or aqueous alkali in order to cause hydrolysis of the acylamino group or groups. Such azo or polyazo compounds may be obtained from aromatic primary amines and/or coupling components containing acylamino groups. As examples of such aromatic primary amines, in addition to the acylaminoarylamines mentioned above, there may be mentioned monoacetylbenzidine, 4-amino - 1 - acetylaminonaphthalene - 6 - sulphonic acid, 4-amino-4'-acetylaminodiphenyl - 3 - sulphonic acid, 4-amino-4'-acetylaminostilbene - 2:2'-disulphonic acid, and as examples of coupling components there may be mentioned 2-acetylamino-5 - naphthol - 7-sulphonic acid, 2-acetylmethylamino-5-naphthol - 7 - sulphonic acid, 2-acetylamino- and acetylmethylamino - 8 - naphthol-6-sulphonic acids, and 1-acetylamino-8-naphthol-3:6- and 4:6-disulphonic acids.

Yet a further method of obtaining the dyestuff compounds of the azo series which may be used as starting materials is to treat an azo or polyazo compound containing one or two nitro groups attached to an aromatic ring, with a reducing agent for example sodium sulphide, sodium hydrogen sulphide or sodium di- or polysulphides, known to be capable of reducing an aromatic nitro compound to the corresponding amino compound.

As examples of dyestuff compounds of the anthraquinone series which may be used as starting materials for making the new dyestuffs of the invention there may be mentioned those containing one or two primary or secondary amino groups as substitutents in an alkylamino or an arylamino group attached to an alpha-position of the anthraquinone nucleus. As examples there may be mentioned 1 - amino - 4 - (4'-aminoanilino)anthraquinone 2:3'-disulphonic acid and the corresponding 2:3':5- and 2:3':6-trisulphonic acids, 1 - amino - 4-(4''-amino-4'-benzoylaminoaniline) - anthraquinone - 2:3-disulphonic acid and the corresponding 2:3':5-trisulphonic acid, 1-amino - 4 - [4' - (4''-aminophenylazo)-anilino]-anthraquinone - 2:2'':5 - trisulphonic acid, 1 - amino - 4 - (4'-amino - 3' - carboxyanilino - )anthraquinone - 2:5 - disulphonic acid, 1 - amino - 4 - (3'-aminoanilino)anthraquinone - 2:4':5 - trisulphonic acid and the corresponding 2:4' - disulphonic acid, 1 - amino - 4 - [4'-(4''-aminophenyl-)anilino]anthraquinone - 2:3'':5 - trisulphonic acid, 1 - amino - 4 - (4' - methylamino)anilino - anthraquinone - 2:3' - disulphonic acid and the corresponding 2:3':5 - trisulphonic acid, 1-amino-4-(4'-n-butylamino) anilino-anthraquinone-2:3' - disulphonic acid, 1 - amino - 4 - (4' - methylamino - 3' - carboxyanilino-)anthraquinone-2 - sulphonic acid and 1 - amino - 4-(3'-beta-hydroxyethylamino-)anilino - anthraquinone - 2:5 - disulphonic acid, 1:4' - aminoanilinoanthraquinone - 2:3'-disulphonic acid and 1 - amino - 4 - (4'-amino-2'-methoxyanilino)-anthraquinone-2:3'-disulphonic acid.

These starting materials of the anthraquinone series may themselves be obtained from anthraquinone compounds, containing a halogen atom or a nitro group attached to the appropriate alpha-position of the anthraquinone nucleus, or from the leuco derivative of a 1:4-dihydroxy, -diamino- or -amino-hydroxy-anthraquinone, by interacting the appropriate anthraquinone compound with at least one molecular proportion of an aliphatic or an aromatic diamine.

Dyestuff compounds of the phthalocyanine series which may be used as starting materials for making the new dyestuffs of the invention are those containing one or two primary or secondary amino groups. Preferred dyestuff compounds of the phthalocyanine series are metal-containing phthalocyanines, in particular copper phthalocyanine which contains at least one sulphonic acid group and one or two primary or secondary amino groups. The primary or secondary amino group or groups may be attached directly to the benz-rings of the phthalocyanine nucleus or they may be attached thereto through a divalent bridging radical for example -phenylene-, —CO-phenylene-, SO₂-phenylene-, —NH-phenylene-, —S-phenylene-, —O-phenylene-, —CH₂S-phenylene-, —CH₂O - phenylene-, —CH₂-phenylene-, —SCH₂-phenylene-, —SO₂CH₂-phenylene-, —SO₂NR - phenylene-CH₂—, —SO₂NR-arylene-, —NRCO-phenylene, —NRSO₂-phenylene-, —SO₂O-phenylene-, —CH₂—, —CH₂NR-phenylene, —CH₂NH.CO-phenylene-, —SO₂NR-alkylene-, CH₂NR - alkylene-, —CONR-phenylene-CH₂—, —CONR-arylene-, —SO₂—, and —CO—. In the above divalent bridging radicals, R stands for hydrogen, alkyl or cycloalkyl, arylene stands for an aromatic divalent bridging radical wherein the terminal valence bonds may be attached to the same or different nuclei, and alkylene stands for an aliphatic divalent radical which may include hetero-atoms such as nitrogen as well as carbon in the chain of atoms, for example it may stand for the radical

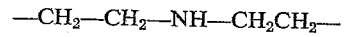

—CH₂—CH₂—NH—CH₂CH₂— and the phenylene groups may be substituted, for example by halogen, alkyl and alkoxy.

As examples of aromatic divalent bridging radicals denoted by arylene there may be mentioned aromatic nuclei, for example a benzene nucleus, a napthalene nucleus, an acridine nucleus and a carbazole nucleus, which nuclei may bear further substituents, and radicals of the formula:

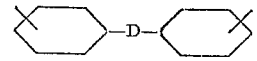

wherein the benzene rings may bear further substitutents and wherein —D— stands for a bridging group, for example —CH=CH—, —NH—, —S—, —O—, —SO₂—, —NO=N—, —N=N—, —NH.CO.NH—, —CO.NH—, —O.CH₂CH₂O— and

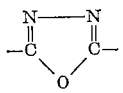

As specific examples of dyestuff compounds of the phthalocyanine series which may be used in the process of the invention there may be mentioned copper phthalocyanine - 4 - N - (4 - amino - 3 - sulphophenyl) - sulphonamide - 4′:4″:4‴ - trisulphonic acid, cobalt phthalocyanine - 4:4′ - di - N - (3′ - amino - 4′ - sulphophenyl-)carbonamide - 4″:4‴ - dicarboxylic acid and copper - 4-(4′-amino-3′-sulphobenzoyl-)phthalocyanine.

There may also be used mixtures of aminophthalocyanines, for example there may be used a mixture of approximately equal parts of copper phthalocyanine-N-(4 - amino - 3 - sulphophenyl-)sulphonamide trisulphonic acid and copper phthalocyanine di-[N-(4-amino-3-sulphophenyl-)sulphonamide]disulphonic acid.

The aminophthalocyanines used which contain a sulphonic acid can be manufactured either by the sulphonation of known phthalocyanines containing primary or secondary amino groups or by synthesis from mixtures of phthalic acid derivatives and sulphonated phthalic acid derivatives. Thus treatment with a sulphonating agent for example oleum such as 20% solution of sulphur trioxide in sulphuric acid of the amines described in United Kingdom specifications Nos. 569,200 and 589,118 gives suitable aminophthalocyanines. The aminophthalocyanine compounds so obtained are those containing the divalent bridging radicals -phenylene-, —CO-phenylene-, —SO₂-phenylene-, —NH-phenylene-, —S-phenylene-, —O-phenylene, —CH₂S-phenylene-, —CH₂O-phenylene, —CH₂-phenylene-, —SCH₂-phenylene- and —SO₂CH₂-phenylene.

Those aminophthalocyanine compounds which contain the divalent bridging radicals mentioned in the last paragraph and also those containing —NRCO-phenylene-, —SO₂NR-phenylene-, —NRSO₂-phenylene-, and SO₂O-phenylene linkages as bridging radicals may be obtained by heating together suitable derivatives of sulphonated phthalic acid and the substituted phthalic acids mentioned in the aforesaid United Kingdom specifications Nos. 569,200 and 589,118 by the general methods known to be used for the manufacture of phthalocyanines from suitable phthalic acid derivatives, for example, by heating together a mixture of 4-sulphophthalic anhydride and 4-o-nitrobenzoylphthalic anhydride, urea, cupric chloride, and ammonium molybdate in o-dichlorobenzene at about 150° C.; those which contain the —CH₂— linkage may be obtained by sulphonation of the primary and secondary amines of United Kingdom specifications Nos. 717,137 and 724,212; those which contain the —CH₂NR-phenylene-linkage may be obtained by reacting a primary (or secondary N-alkyl or cycloalkyl-)nitroaniline with a phthalocyanine containing chloromethyl and sulphonic or carboxylic acid groups obtained by chloromethylation of a phthalocyanine sulphonic or carboxylic acid, and reducing the product so obtained for example with sodium sulphide or by reacting a chloro-methyl phthalocyanine with for example a diaminobenzenesulphonic acid or -carboxylic acid; those which contain the SO₂NR-alkylene--linkage may be obtained by reacting a phthalocyanine containing chlorosulphonyl groups with a monoacetyl alkylene diamine in the presence of water, and treating the product so obtained (which contains both sulphonamide and sulphonic acid groups) with aqueous alkali to hydrolyse the acetylamino group; those which contain the —SO₂NR-phenylene—CH₂-linkage may be obtained in a similar manner by using an amino-N-benzylacetamide in place of the monoacetylalkylene diamine; those which contain the —CH₂.NR-alkylene- linkage may be obtained by reacting a phthalocyanine containing chloromethyl and sulphonic or carboxylic acid groups with a monoacetyl alkylene diamine and treating the product so obtained with aqueous alkali to hydrolyse the acetylamino groups; those containing a direct link, so that the amino group is attached directly to the phthalocyanine nucleus, may be obtained by sulphonating the amino-phthalocyanines described in United Kingdom specification No. 529,847 or where a starting material containing less than 4 amino groups attached to the phthalocyanine nucleus is desired, it may be obtained by heating together a mixture of suitable carboxy- or sulphophthalic acid derivatives with one of the substituted phthalic acid derivatives used as starting materials in United Kingdom specification No. 529,847 under conditions known to be used for the manufacture of phthalocyanines from phthalic acid derivatives, for example by heating the anhydrides with urea and a catalyst for example ammonium molybdate in an organic solvent for example o-dichlorobenzene, and reducing the nitro-phthalocyanine sulphonic or carboxylic acid or hydrolysing the acylaminophthalocyanine sulphonic or carboxylic acid so obtained by known methods for the conversion of aromatic nitro or acylamino compounds to the corresponding amines; and those containing the —CO.NR-phenylene-linkage may be obtained by reacting a phthalocyanine compound containing carboxylic acid chloride groups with a diaminobenzene sulphonic acid or carboxylic acid or with an aminobenzene sulphonic acid or an aminobenzoic acid which also contains a nitro group and reducing the nitro compound so obtained; and those containing the —CO—NR-phenylene—CH₂-linkage may be obtained by reacting a phthalocyanine compound containing carboxylic acid chloride groups with an N-(amino-benzyl-)acetamide and subsequently hydrolysing the product so obtained with aqueous alkali.

Suitable dyestuff compounds of the nitro series which may be used as starting materials for making the new dyestuffs of the invention are those of the formula:

where B stands for a naphthalene or benzene nucleus which may be further substituted wherein the nitrogen atom N is in the ortho position to the nitro group, X′ stands for hydrogen or for a hydrocarbon radical which may be substituted, R stands for hydrogen or for an organic radical attached to the nitrogen through a carbon atom, provided that X′ and R are not both hydrogen, and wherein R may be connected to X′ when X′ is a hydrocarbon radical or to B, in the ortho position to the nitrogen atom, N, to form a heterocyclic ring, and which contain one or two primary or secondary amino groups.

As specific examples of dyestuff compounds of the nitro series which may be used there may be mentioned sulphonic acid derivatives of substituted diphenylamines and phenylnaphthylamines, for example 2:4-dinitro-4′-aminodiphenylamine-3′-sulphonic acid, 2-nitro-3′-amino-4′-carboxydiphenylamine-4-sulphonic acid, 2-nitro-4′-(p-aminoanilino-)diphenylamine-3′:4-disulphonic acid, 2-nitro-4′-methylaminodiphenylamine-3′:4-disulphonic acid, 2-nitro-4′ - methylamino - 4 - sulphon-betahydroxyethylamidodiphenylamine-3′-sulphonic acid, 2-nitro-4′-methylamino-4-carboxydiphenylamine-3′-sulphonic acid, 2-nitro-4′-amino-1′-naphthylphenylamine-4:6′-disulphonic acid and 1:5-dinitro - 2:6 - di - (4-amino-3-sulphoanilino-)napthalene. These sulphonic acid derivatives may conveniently be obtained by the reaction of the appropriately substituted o-nitrochloro-benzene or -naphthalene with the appropriately substituted diamine, (at least one of the reagents containing a sulphonic acid group) in aqueous or alcoholic media in the presence of an acid-binding agent for example calcium carbonate at elevated temperatures for example at a temperature of 100° C.

As examples of dyestuff compounds containing one or two primary or secondary amino groups which can be used in the process of the invention there may be mentioned the compounds of the following classes without, however, limiting the classes to those specifically described. In the following classes R' denotes a primary or secondary amino group.

(1) Monoazo compounds of the formula:

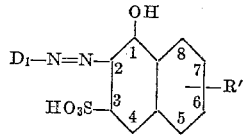

Formula I wherein $D_1$ represents a mono or di-cyclic aryl radical which is free from azo groups and primary and secondary amino groups, R' is preferably attached to the 6-, 7- or 8-position of the naphthalene nucleus, and which may contain a sulphonic acid group in the 5- or 6-position of the naphthalene nucleus.

$D_1$ may represent a radical of the naphthalene or benzene series which is free from azo substituents, for example a stilbene, diphenyl, benzthiazolylphenyl or diphenylamine radical. Also in this class are to be considered the related dyestuffs in which R' instead of being attached to the naphthalene nucleus, is attached to a benzoylamino or anilino group which is attached to the 6-, 7- or 8-position of the naphthalene nucleus.

Particularly valuable dyestuffs are obtained from those wherein $D_1$ represents a sulphonated phenyl or naphthyl radical, especially those which contain a —$SO_3H$ group in ortho position to the azo link; the phenyl radical may be further substituted for example, by halogen atoms such as chlorine, alkyl radicals such as methyl, acylamino groups such as acetylamino and alkoxy radicals such as methoxy.

(2) Disazo compounds of Formula I, wherein $D_1$ stands for a radical of the azobenzene, azonaphthalene or phenylazonaphthalene series and the naphthalene nucleus is substituted by the NHR group, and optionally by sulphonic acid as in class 1.

(3) Monoazo compounds of the formula:

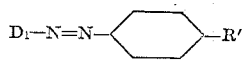

Formula II wherein $D_1$ stands for an at most dicyclic aryl radical as described for class 1 and is preferably a disulphonaphthyl or a stilbene radical, and the benzene nucleus may contain further substitutents such as halogen atoms, or alkyl, alkoxy, carboxylic acid and acylamino groups.

(4) Mono- or disazo compounds of the formula:

$$R'—D_1—N=N—K \qquad \text{Formula III}$$

wherein $D_1$ represents an arylene radical such as a radical of the azobenzene, azonaphthalene or phenylazonaphthalene series, or, preferably, an at most dicyclic arylene radical of the benzene or naphthalene series, and K represents the radical of a naphthol sulphonic acid or the radical of an enolised or enolisable ketomethylene compound (such as an acetoacetarylide or a 5-pyrazolone) having the OH group o- to the azo group. $D_1$ preferably represents a radical of the benzene series containing a sulphonic acid group.

(5) Mono- or disazo compounds of the formula:

$$D_1—N=N—K_2—R' \qquad \text{Formula IV}$$

wherein $D_1$ represents a radical of the types defined for $D_1$ in classes 1 and 2 above and $K_2$ represents the radical of an enolisable ketomethylene compound (such as an acetoacetarylide or a 5-pyrazolone) having the —OH group in $\alpha$-position to the azo group.

(6) The metal complex, e.g. the copper, chromium and cobalt complex, compounds of those dyes of Formulae I, III and IV (wherein $D_1$, K and $K_2$ have all the respective meanings stated) which contain a metallisable (for example, a hydroxyl, lower alkoxy or carboxylic acid) group ortho to the azo group in $D_1$.

(7) Anthraquinone compounds of the formula:

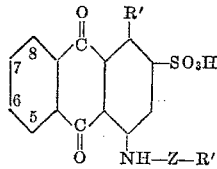

wherein the anthraquinone nucleus may contain an additional sulphonic acid group in the 5-, 6-, 7- or 8-position and Z represents a bridging group which is preferably a divalent radical of the benzene series, for example phenylene, disphenylene or 4,4'-divalent stilbene or azobenzene radicals. It is preferred that Z should contain one sulphonic acid group for each benzene ring present.

(8) Phthalocyanine compounds of the formula:

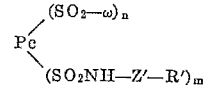

wherein Pc represents the phthalocyanine nucleus preferably of copper phthalocyanine, $\omega$ represents a hydroxy and/or an amino or substituted amino group, Z' represents a bridging group, preferably an aliphatic, cycloaliphatic or aromatic bridging group, $n$ and $m$ each represents 1, 2 or 3 and may be the same or different provided that $n+m$ is not greater than 4.

IN CLASS 1

6-amino-1-hydroxy-2-(2' - sulphophenylazo)naphthalene-3-sulphonic acid, 6-methylamino - 1 - hydroxy-2-(4'-acetylamino-2'-sulphophenylazo)naphthalene-3-sulphonic acid, 8-amino-1-hydroxy-2-(2' - sulphophenylazo)naphthalene-3:6-disulphonic acid, 8-amino - 1 - hydroxy-2-(4'-chloro-2'-sulphophenylazo)-naphthalene-3:5-disulphonic acid, 7 - amino - 2 - (2':5'-disulphophenylazo)-1-hydroxynaphthalene-3-sulphonic acid, 7-methylamino-2-(2' - sulphophenylazo)-1-hydroxynaphthalene-3-sulphonic acid, 7-methylamino-2-(4'-methoxy - 2' - sulphophenylazo)-1-hydroxynaphthalene-3-sulphonic acid, 8-(3' - aminobenzoylamino)-1-hydroxy-2-(2'-sulphophenylazo)-naphthalene-3:6-disulphonic acid, 8-amino-1-hydroxy-2:2' - azonaphthalene-1':3:5':6-tetrasulphonic acid, 8-amino - 1 - hydroxy-2:2'-azonaphthalene-1':3:5'-trisulphonic acid, 6-amino - 1 - hydroxy-2:2'-azonaphthalene-1':3:5'-trisulphonic acid, 6-methylamino - 1 - hydroxy-2:2'-azonaphthalene-1':3:5'-trisulphonic acid, 7-amino-1-hydroxy-2:2' - azonaphthalene-1':3-disulphonic acid, 8-amino-1-hydroxy-2-(4' - hydroxy-3'-carboxyphenylazo)-naphthalene-3:6-disulphonic acid, 6-amino-1-hydroxy-2-(4' - hydroxy-3'-carboxyphenylazo)-naphthalene-3:5-disulphonic acid.

IN CLASS 2

8-amino-1-hydroxy-2-[4'-(2'' - sulphophenylazo)-2'-methoxy-5'-methylphenylazo]naphthalene - 3:6 - disulphonic acid, 8 - amino - 1 - hydroxy-2-[4'-(4''-methoxyphenylazo)-2'-carboxyphenylazo]naphthalene-3:6-disulphonic acid, 8-amino - 1 - hydroxy-2-[4'-(2''-hydroxy-3'':6''-disulpho-1''-naphthylazo) - 2' - carboxyphenylazo]naphthalene-3:6-disulphonic acid, 4:4' - bis(8''-amino-1'''-hydroxy-3''':6'''-disulpho-2''-naphthylazo)-3:3'-dimethoxydiphenyl, 6-amino-1-hydroxy-2-[4'-(2'' - sulphophenylazo)-2'-methoxy-5'-methylphenylazo]naphthalene - 3:5 - disulphonic acid,

IN CLASS 3

2-(4'-amino - 2' - methylphenylazo)naphthalene-4:8-disulphonic acid, 2-(4' - amino-2'-acetylaminophenylazo)naphthalene-5:7-disulphonic acid, 4-nitro-4' - (4'' - methylaminophenylazo)stilbene-2:2'-disulphonic acid, 4 - nitro-4'-(4''-amino-2''-methyl-5''-methoxyphenylazo)-stilbene-2:2'-disulphonic acid, 4-amino-4' - (4'' - methoxyphenylazo)stilbene-2:2'-disulphonic acid, 4-amino-2-methylazobenzene-2':5'-disulphonic acid.

IN CLASS 4

1 - (2':5' - dichloro - 4' - sulphophenyl)-3-methyl-4-(3''-amino-4''-sulphophenylazo)-5-pyrazolone, 1-(4'-sulphophenyl) - 3 - carboxy-4-(4''-amino-3''-sulphophenylazo)-5-pyrazolone, 1-(2'-methyl-5'-sulphophenyl) - 3 - methyl-4-(4''-amino-3''-sulphophenylazo)-5-pyrazolone, 1-(2'-sulphophenyl) - 3 - methyl-4-(3''-amino-4''-sulphohenylazo)-5-pyrazolone, 4-amino-4'-(3''-methyl - 1'' - phenyl-4''-pyrazol-5''-onylazo)stilbene-2:2'-disulphonic acid, 4-amino-4'-(2''-hydroxy-3'':6''-disulpho - 1'' - naphthylazo)-stilbene-2:2'-disulphonic acid, 8-acetylamino - 1 - hydroxy-2-(3'-amino-4'-sulphophenylazo)naphthalene-3:6-disulphonic acid, 7 - (3'-sulphophenylamino) - 1 - hydroxy-2-(4'-amino-2'-carboxyphenylazo)naphthalene-3-sulphonic acid, 8 - phenylamino-1-hydroxy-2-(4'-amino-2'-sulphophenylazo)naphthalene-3:6-disulphonic acid, 6-acetylamino - 1 - hydroxy-2-(5'-amino-2'-sulphophenylazo)naphthalene-3-sulphonic acid.

IN CLASS 5

1-(3'-aminophenyl) - 3 - methyl-4-(2':5'-disulphophenylazo)-5-pyrazolone, 1-(3' - aminophenyl)-3-carboxy-4-(2'-carboxy-4'-sulphophenylazo)-5-pyrazolone, 4 - amino-4'-[3''-methyl-4''-(2''':5'''-disulphophenylazo)-1''-pyrazol-5''-onyl]stilbene-2:2'-disulphonic acid, 1-(3' - aminophenyl)-3-carboxy-4-[4''-(2''':5'''-disulphophenylazo)-2''-methoxy - 5'' - methylphenylazo]-5-pyrazolone.

IN CLASS 6

The copper complex of 8-amino-1-hydroxy-2-(2'-hydroxy-5'-sulphophenylazo)naphthalene-3:6-disulphonic acid, The copper complex of 6-amino-1-hydroxy-2-(2'-hydroxy-5'-sulphophenylazo)naphthalene-3-sulphonic acid, The copper complex of 6-amino-1-hydroxy-2-(2'-hydroxy-5'-sulphophenylazo)naphthalene-3:5-disulphonic acid, The copper complex of 8-amino-1-hydroxy-2-(2'-hydroxy-3'-chloro - 5' - sulphophenylazo)naphthalene-3:6-disulphonic acid, The copper complex of 6 - methylamino - 1 - hydroxy-2-(2' - carboxy - 5' - sulphophenylazo)naphthalene-3-sulphonic acid, The copper complex of 8-amino-1-hydroxy-2-[4'-(2''-sulphophenylazo) - 2' - methoxy - 5' - methylphenylazo]-naphthalene-3:6-disulphonic acid, The copper complex of 6-amino-1-hydroxy-2-[4'-(2'':5''-disulphophenylazo) - 2' - methoxy - 5' - methylphenylazo]naphthalene-3:5-disulphonic acid, The copper complex of 1-(3'-amino-4'-sulphophenyl)-3-methyl - 4 - [4''-(2''':5'''-disulphophenylazo)-2''-methoxy-5''-methylphenylazo]-5-pyrazolone, The copper complex of 7-(4'-amino-3'-sulphoanilino)-1-hydroxy-2-[4''-(2''':5''' - disulphophenylazo)-2''-methoxy-5''-methylphenylazo]naphthalene-3-sulphonic acid, The copper complex of 6-(4'-amino-3'-sulphonilino)-1-hydroxy - 2 - (2''-carboxyphenylazo)naphthalene-3-sulphonic acid, The 1:2-chromium complex of 7-amino-6'-nitro-1:2'-dihydroxy-2:1'-azonaphthalene-3:4'-disulphonic acid, The 1:2-chromium complex of 6-amino-1-hydroxy-2-(2'-carboxyphenylazo)naphthalene-3-sulphonic acid, The 1:2-chromium complex of 8-amino-1-hydroxy-2-(4'-nitro - 2' - hydroxyphenylazo)naphthalene - 3:6 - disulphonic acid, The 1:2-cobalt complex of 6-(4'-amino-3'-sulphoanilino)-1-hydroxy-2-(5''-chloro - 2'' - hydroxyphenylazo)naphthalene-3-sulphonic acid, The 1:2-chromium complex of 1 - (3' - amino-4'-sulphophenyl) - 3 - methyl-4-(2''-hydroxy-4''-sulpho-1''-naphthylazo)-5-pyrazolone, The 1:2-chromium complex of 7-(4'-sulphonilino)-1-hydroxy-2-(4'' - amino - 2'' - carboxyphenylazo)naphthalene-3-sulphonic acid, The 1:2-chromium complex of 1-(3'-aminophenyl)-3-methyl - 4 - (4''-nitro-2''-carboxyphenylazo)-5-pyrazolone.

IN CLASS 7

1 - amino-4-(3'-amino-4'-sulphoanilino)anthraquinone-2-sulphonic acid, 1-amino-4-(4'-amino - 3' - sulphoanilino)anthraquinone-2:5-disulphonic acid, 1 - amino-4-[4'-(4''-amino-3''-sulphophenyl)anilino]-anthraquinone-2:5-disulphonic acid, 1-amino-4-[4'-(4''-amino-2'' - sulphophenylazo)anilino]-anthraquinone-2:5-disulphonic acid, 1-amino-4-(4' - methylamino-3'-sulphoanilino)anthraquinone-2-sulphonic acid.

IN CLASS 8

3 - (3'-amino-4'-sulphophenyl)sulphamyl copper phthalocyanine-tri-3-sulphonic acid, Di - 4 - (3'-amino - 4' - sulphophenyl)sulphamyl copper phthalocyanine-di-4-sulphonic acid, 3 - (3' - aminophenylsulphamyl) - 3 - sulphamyl copper phthalocyanine-di-3-sulphonic acid, According to a further feature of the invention there is provided a modified process for the manufacture of the new dyestuffs of the invention wherein D represents the residue of an azo dyestuff containing one or two primary or secondary amino groups, which comprises diazotising a primary aromatic amine, or the corresponding sulphamic acid, and coupling the diazo compound so obtained with a coupling component, the primary aromatic amine and the coupling component containing one or two

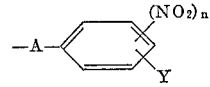

groups, as hereinbefore defined.

This modified process of the invention may be conveniently brought about by adding sodium nitrite to a solution or suspension of the primary aromatic amine, which may be an aminoazo compound (or the corresponding sulphamic acid), in a dilute aqueous solution of hydrochloric acid, adding the resulting solution or suspension of the diazo compound to a solution of the coupling component and filtering off the dyestuff which is precipitated. If necessary sodium chloride can be added to ensure complete precipitation of all the azo dyestuff.

The primary amine, or the corresponding sulphamic acid, used in this modified process of the invention can be a member of any of the known series of diazotisable primary amines of the benzene or naphthalene series which optionally contains an arylazo group. The coupling component used in this modified process of the invention can be a member of any of the known series of coupling components, but preferably it is a coupling component of the acylacetarylide, 5-pyrazolone, phenol, naphthol or arylamine series.

Those coupling components which contain a group of the formula:

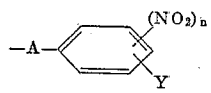

as hereinbefore defined, may themselves be obtained by treating the corresponding coupling component containing a primary or secondary amino group with an acid halide, as hereinbefore defined.

Those primary amines, or the corresponding sulphamic acids, which contain a group of the formula:

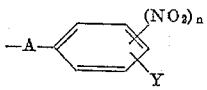

may themselves be obtained by treating the corresponding primary amine, or the corresponding sulphamic acid, and containing a primary or secondary amino group with an acid halide as hereinbefore defined.

A preferred class of the new dyestuffs of the invention are those dyestuffs which contain at least one water-solubilising group, which is preferably a sulphonic acid group, and it is preferred that the —CO— or —SO$_2$— group represented by A and the nitro group or groups are attached to the benzene ring in ortho or para position to the halogen atom represented by Y.

The new dyestuffs of the invention are valuable for colouring natural and artificial textile materials for example cellulose textile materials such as cotton, viscose rayon and linen, and woollen textile materials, whereby the textile materials are coloured in a wide range of shades which possess good fastness to wet treatments such as washing.

The dyestuffs may be applied to the textile materials by either a dyeing or printing process. In the case of cellulose textile materials it is preferred to apply the dyestuffs to the textile materials in conjunction with a treatment with an acid-binding agent, which may be carried out before, after or during the application of the dyestuff. As examples of such acid-binding agents there may be mentioned sodium carbonate, trisodium phosphate, sodium silicate and sodium or potassium hydroxide, or there may be used substances such as sodium bicarbonate or sodium trichloroacetate which on heating or steaming liberate an acid-binding agent.

The new dyestuffs of the invention are particularly valable for colouring woollen textile materials and this may be conveniently brought about by applying the dyestuffs from a mildly alkaline, neutral or acid dyebath. The dyeing process can be carried out at a constant or substantially constant pH, that is to say the pH of the dyebath remains constant or substantially constant during the dyeing process, or if desired the pH of the dyebath can be altered at any stage of the dyeing process by the addition of acids or acid salts, or alkalis or alkaline salts. For example dyeing may be started at a dyebath pH of about 3.5 to 5.5 and raised during the dyeing process to about 6.5 to 7.5 or higher if desired.

The invention is illustrated but not limited by the following examples in which parts and percentages are by weight:

*Example 1*

A mixture of 4.6 parts of 4-amino-2'-hydroxy-5'-methylazobenzene, 150 parts of acetone and 100 parts of water are stirred at a temperature of 5 to 10° C. and a solution of 5.2 parts of 4-chloro-3-nitrobenzene sulphonchloride in 20 parts of acetone is added during 1 hour, maintaining the mixture neutral by addition of sodium carbonate. The mixture is stirred for 16 hours at a temperature of 10 to 20° C., then filtered and the product on the filter is washed with water and dried.

The new dyestuff so obtained is a yellow-brown powder which dyes polyamide textile materials in yellow shades of good washing fastness.

If in place of the 4-chloro-3-nitrobenzene sulphonchloride used in the above example, there are used 6.0 parts of 4-chloro-3:5-dinitrobenzene sulphonchloride, a similar product is obtained.

*Example 2*

A solution of 10 parts of 4-chloro-3-nitrobenzene sulphonchloride in 12 parts of acetone is added during 3 hours to a solution of 15.8 parts of the trisodium salt of 6 - methylamino - 1 - hydroxy - 2:2' - azonaphthalene-1':3:5'-trisulphonic acid and 1 part of the disodium salt of dinaphthylmethane disulphonic acid, the temperature being maintained at 20° C. and the mixture is stirred for 16 hours, the pH being kept at 7 to 8 by the addition of sodium carbonate. The mixture is then filtered and sodium chloride is added to the filtrate to precipitate the dyestuff. The precipitate is filtered off, washed with water and then with acetone and dried.

The new dyestuff so obtained is a powder which dyes cotton, viscose rayon and wool in orange shades of good fastness to washing.

*Example 3*

A solution of 10 parts of 4-chloro-3:5-dinitrobenzene sulphonchloride in 80 parts of acetone is added during 4 hours to a solution of 6.3 parts of the trisodium salt of 6-methylamino - 1 - hydroxy - 2:2' - azonaphthalene-1':3:5'-trisulphonic acid and 0.5 part of the disodium salt of dinaphthylmethane disulphonic acid, the temperature being maintained at 20° C., and the mixture is stirred for 48 hours, the pH being kept at 7 to 8 by the addition of sodium carbonate. The mixture is then filtered and sodium chloride is added to the filtrate to precipitate the dyestuff. The precipitate is filtered off, washed with brine and dried.

The new dyestuff so obtained is a yellow brown powder which dyes cotton, viscose rayon and wool in orange shades of good fastness to washing.

*Example 4*

A solution of 12 parts of 4-chloro-3-nitrobenzene sulphonchloride in 80 parts of acetone is added to a solution of 6.35 parts of the trisodium salt of 1-amino-4-(4'-aminoanilino) anthraquinone-2:3':5-trisulphonic acid in 70 parts of water, and the resulting mixture is stirred at 20° C. until no further additions of a 10% aqueous solution of sodium carbonate are required to maintain the pH of the mixture at 7. 20 parts of sodium chloride are then added and the precipitated dyestuff is filtered off, washed with a 20% aqueous solution of sodium chloride and dried.

When applied to cellulose textile materials in conjunction with a treatment with an acid-binding agent the dyestuff yields blue shades possessing good fastness to wet treatments.

*Example 5*

A solution of 7.8 parts of 4-chloro-3-nitrobenzene sulphonchloride in 20 parts of acetone is added, during 2 hours, to a solution of 15.6 parts of the sodium salt of copper phthalocyanine 3-sulphon-N-(3'-amino-4'-sulphophenyl)amine sulphonic acid and 1 part of the disodium salt of dinaphthylmethane disulphonic acid in 300 parts of water, and the resulting mixture is stirred for 20 hours at 20° C., 22 parts of a 2 N aqueous solution of sodium carbonate being gradually added to maintain the pH of the mixture between 7 and 8. 500 parts of acetone, 15.5 parts of 4-chloro-3-nitrobenzene sulphonchloride and 57 parts of a 2 N aqueous solution of sodium carbonate are then added and the mixture is stirred for a further 3 hours at 20° C. The resulting solution is then evaporated until the volume is 400 ccs., sodium chloride is added until the solution contains 15% by weight of sodium chloride and the precipitated dyestuff is filtered off and dried.

When applied to wool from a slightly acid dyebath the dyestuff yields greenish-blue shades possessing very good fastness to washing.

Example 6

7 parts of a concentrated aqueous solution of hydrochloric acid are added to a solution of 1.94 parts of 6-nitro-2-aminophenol-4-sulphonamide and 1.2 parts of sodium hydroxide in 50 parts of water. The resulting mixture is cooled to 0° C. and a solution of 0.58 part of sodium nitrite in 4.2 parts of water is then added, the temperature of the mixture being maintained between 0° and 5° C. by external cooling. Sodium bicarbonate is then added until the mixture is neutral to Congo red and the mixture is added to a solution of 3.31 parts of 1-(4'-chloro-3'-nitrobenzenesulphonyl)amino-7-naphthol, 0.8 part of sodium hydroxide and 2 parts of sodium carbonate in 150 parts of water, the temperature of the mixture being maintained between 0° and 5° C. by external cooling. The mixture is stirred for 4 hours at this temperature and the precipitated dyestuff is then filtered off, washed with a 5% aqueous solution of sodium bicarbonate and dried.

When applied to woollen textile materials by the metachrome or afterchrome process the dyestuff yields grey shades possessing food fastness to washing.

Example 7

In place of the 1.94 parts of 6-nitro-2-aminophenol-4-sulphonamide used in Example 6 there are used 1.54 parts of 4-nitro-2-aminophenol-4-sulphonamide when a similar dyestuff is obtained.

The 1 - (4' - chloro-3'-nitrobenzenesulphonyl)amino-7-naphthol used in Examples 6 and 7 may be obtained as follows:

15.9 parts of 1-amino-7-naphthol are dissolved in a mixture of 150 parts of water and 15 parts of a concentrated aqueous solution of hydrochloric acid and sodium acetate is then added until the solution is no longer acid to Congo red. The solution is cooled to 0° C., a solution of 52 parts of 4-chloro-3-nitrobenzene sulphonchloride in 55 parts of acetone is added and the mixture is stirred for 20 hours at a temperature between 0° and 5° C., 26 parts of sodium acetate crystals being gradually added to maintain the mixture neutral to Congo red. 77 parts of a 32% aqueous solution of sodium hydroxide are added and the mixture is filtered. 47 parts of a concentrated aqueous solution of hydrochloric acid are added to the filtrate and the precipitated 1-(4'-chloro-3'-nitrobenzenesulphonyl)amino-7-naphthol is filtered off, washed with water and dried. The product melts at 122° and 124° C.

Example 8

A mixture of 5.18 parts of the dyestuff of Example 6, 1.41 parts of chromium acetate, 90 parts of β-ethoxyethanol and 100 parts of water is stirred at the boil under a reflux condenser for 1¾ hours. 5 parts of an aqueous solution of sodium potassium chromosalicylate (which is obtained as described in Example 2 of British specification No. 787,305) are then added and the mixture is stirred at the boil for a further ¾ hour. The resulting solution is filtered and the filtrate is poured into 300 parts of a 20% aqueous solution of sodium chloride. The precipitated dyestuff is then filtered off, washed with a 5% aqueous solution of sodium chloride and dried.

On analysis the dyestuff is found to contain 0.98 atom of organically bound chlorine for each azo group present in the dyestuff.

When applied to wool from a slightly acid dyebath the dyestuff yields grey shades possessing good fastness to washing.

Example 9

A mixture of 5.43 parts of the dyestuff of Example 7, 1.56 parts of chromium acetate, 90 parts of β-ethoxyethanol and 100 parts of water is stirred for 1 hour at the boil under a reflux condenser. The resulting solution is then cooled to 20° C., filtered and the filtrate is poured into 400 parts of a saturated aqueous solution of sodium chloride. The precipitated dyestuff is then filtered off, washed with water and dried.

On analysis the dyestuff is found to contain 1.05 atoms of organically bound chlorine for each azo group present in the dyestuff.

When applied to wool from a slightly acid dyebath the dyestuff yields olive shades possessing good fastness to washing.

Example 10

A solution of 50 parts of 2-chloro-5-nitrobenzene sulphonchloride in 75 parts of benzene is added, during 30 minutes, to a solution of 28.3 parts of the trisodium salt of 2-methylamino-6-(1':5'-disulphonaphth-2'-ylazo) - 5-naphthol-7-sulphonic acid and 1 part of the disodium salt of dinaphthylmethane disulphonic acid in 200 parts of water, and the resulting mixture is stirred at a temperature between 25° and 30° C. until no further additions of sodium carbonate are required to maintain the pH of the mixture between 7 and 8. Sodium chloride is then added to precipitate the dyestuff, which is then filtered off, washed with water, then with acetone, and is finally dried.

The dyestuff so obtained dyes cotton, viscose rayon and woollen textile materials in orange shades which possess good fastness to washing.

Example 11

A solution of 22 parts of 2-chloro-5-nitrobenzoyl chloride in 66 parts of toluene is added, during 2 hours, to a stirred solution of 28.3 parts of the trisodium salt of 2 - methylamino - 6 - (1':5'-disulphonaphth - 2'-ylazo)-5-naphthol-7-sulphonic acid and 1 part of the disodium salt of dinaphthylmethane disulphonic acid in 220 parts of water at a temperature of 35° C., and the mixture is then stirred at a temperature between 35° and 40° C. until no further additions of sodium carbonate are required to maintain the pH of the mixture between 7 and 8. Sodium chloride is added to precipitate the dyestuff, which is then filtered off, washed with a 10% aqueous solution of sodium chloride, and dried.

The dyestuff so obtained dyes cotton, viscose rayon and woollen textile materials in orange shades which possess good fastness to washing.

Example 12

A solution of 25 parts of 4-chloro-3-nitrobenzene sulphonylchloride in 50 parts of acetone is added, during 1 hour, to a stirred solution of 26.1 parts of the disodium salt of 1-(2':5'-dichloro-4'-sulphophenyl) - 3 - methyl-4-(5''-amino-2''-sulphophenylazo)-5-pyrazolone in 200 parts of water at a temperature between 35° and 40° C., and the resulting mixture is then stirred for 2 hours at this temperature. Sodium carbonate is added until the mixture is alkaline to litmus and sodium chloride is then added to precipitate the dyestuff which is filtered off, washed with acetone and dried.

The dye stuff so obtained dyes cotton, viscose rayon and woolen textile materials in yellow shades which possess good fastness to washing.

The following table gives further examples of the new dyestuffs of the invention which are obtained when the 28.3 parts of the trisodium salt of the azo compound used in Example 10 are replaced by equivalent amounts of the sodium salts of the azo compounds listed in the second column of the Table, and the 50 parts of 2-chloro-5-nitrobenzene sulphonchloride used in Example 10 are replaced by equivalent amounts of the acid halides listed in the third column of the table, the reaction between the azo compounds and the acid halides being carried out at 20° C. The fourth column of the table indicates the shades obtained when the dyestuffs are applied to textile materials.

| Example | Azo Compound | Acid Halide | Shade |
|---|---|---|---|
| 13 | 2-amino-6-(2'-sulphophenylazo)-5-naphthol-7-sulphonic acid | 2-bromo-5-nitro-benzene sulphonchloride. | Orange. |
| 14 | 1-(2':5'-dichloro-4'-sulphophenyl)-3-methyl-4-(5''-amino-2''-sulphophenylazo)-5-pyrazolone. | ——do—— | Yellow. |
| 15 | 2-methylamino-6-(1':5'-disulphonaphth-2'-ylazo)-5-naphthol-7-sulphonic acid. | ——do—— | Orange. |
| 16 | ——do—— | 4-bromo-3-nitro-benzene sulphonchloride. | Do. |
| 17 | 2-amino-6-(2'-sulphophenylazo)-5-naphthol-7-sulphonic acid. | ——do—— | Do. |
| 18 | 1-(2':5'-dichloro-4'-sulphophenyl)-3-methyl-4-(5''-amino-2''-sulphophenylazo)-5-pyrazolone. | ——do—— | Yellow. |

*Example 19*

A solution of 21.6 parts of the disodium salt of 2-amino-6-(2'-sulphophenylazo)-5-naphthol - 7 - sulphonic acid in 250 parts of water at a temperature of 60° C. is added to a suspension of 32 parts of 4-chloro-3-nitrobenzene sulphonchloride in a mixture of 25 parts of acetone and 125 parts of water, and the resulting mixture is stirred for 2 hours at 60° C. the pH of the mixture being maintained between 7 and 8 by the addition of sodium carbonate. Sodium chloride is then added to precipitate the dyestuff which is filtered off and dried.

The dyestuff so obtained dyes cotton, viscose rayon and woollen textile materials in orange shades which possess good fastness to washing.

*Example 20*

A solution of 14 parts of 4-chloro-3:5-dinitrobenzene sulphonchloride in 60 parts of acetone is added, during 30 minutes, to a solution of 8.5 parts of the disodium salt of 2 - amino - 6 - (2'-sulphophenylazo)-5-naphthol-7-sulphonic acid and 1 part of the disodium salt of dinaphthylmethane disulphonic acid in 150 parts of water and the resulting mixture is stirred at 30° C. until no further additions of sodium carbonate are required to maintain the pH of the mixture between 7 and 8. Sodium chloride is added to precipitate the dyestuff which is then filtered off, washed with acetone and dried.

The dyestuff so obtained dyes cotton, viscose rayon and woolen textile materials in orange shades which possess good fastness to washing.

*Example 21*

A solution of 12 parts of the disodium salt of 2-(4'-amino-2'-acetylaminophenylazo)naphthalene-4:8-disulphonic acid in 120 parts of water is added to a suspension of 15 parts of 4-chloro-3-nitrobenzene sulphonchloride in a mixture of 12 parts of acetone and 60 parts of water, and the resulting mixture is stirred for 3 hours at 20° C., the pH of the mixture being maintained at 7 by the addition of sodium carbonate. Sodium chloride is added to precipitate the dyestuff, which is then filtered off, washed with acetone and dried.

The dyestuff so obtained dyes cotton, viscose rayon and woolen textile materials in orange shades which possess good fastness to washing.

*Example 22*

To a solution of the mixed 1:2-chromium and cobalt complexes of 2 - amino-6-(2'-hydroxy-4'-sulpho-6'-nitronaphth-1'-ylazo)-5-naphthol-7-sulphonic acid [which is obtained by heating a solution of 13.62 parts of 2-amino-6 - (2'-hydroxy-4'-sulpho-6'-nitronaphth-1'-ylazo)5-naphthol-7-sulphonic acid in 75 parts of water with chromium acetate and cobalt acetate at 100° C.], there are added 5 parts of sulphonated oleic acid and a solution of 32 parts of 4-chloro-3-nitrobenzene sulphonchloride in 50 parts of benzene. The resulting mixture is stirred at 20° C. until no further additions of sodium carbonate are required to maintain the pH of the mixture between 6.5 and 7. Sodium chloride is then added to precipitate the dyestuff, which is filtered off, washed with benzene and dried.

The dyestuff so obtained dyes cotton, viscose rayon and woolen textile materials in black shades which possess good fastness to washing.

*Example 23*

A solution of 5.8 parts of 4-bromo-3-nitrobenzene sulphonchloride in 20 parts of acetone and 50 parts of a N aqueous solution of sodium carbonate are simultaneously added, with stirring, to a solution of 5 parts of 4-amino-2'-hydroxy-5'-methylazobenzene in a mixture of 200 parts of acetone and 100 parts of water at a temperature of 5° C., and the resulting mixture is then stirred for 16 hours at 5° C. The precipitated dyestuff is then filtered off, washed with water and dried.

The dyestuff so obtained, when dispersed in aqueous medium, dyes polyamide and polyethyleneterephthalate textile materials in yellow shades which possess good fastness to washing.

*Example 24*

A solution of 102 parts of 4-chloro-3-nitrobenzene sulphonchloride in 200 parts of benzene is added to a solution of 36.3 parts of the disodium salt of 1-amino-8-naphthol-3:6-disulphonic acid and 0.5 part of the disodium salt of dinaphthylmethane disulphonic acid in 500 parts of water at 25° C., and the mixture is stirred at a temperature between 25° and 30° C. until no further additions of sodium carbonate are required to maintain the pH of the mixture between 7 and 8. 50 parts of sodium carbonate are then added, the mixture is cooled to 0° C., and an aqueous solution of tetrazotised benzidine (which is obtained by tetrazotising 9.2 parts of benzidine by known methods) is added. The resulting mixture is stirred for 2 hours at 5° C., sodium chloride is then added to precipitate the dyestuff which is filtered off and dried. When applied to cellulose textile materials in conjunction with a treatment with an acid-binding agent the dyestuff yields blue shades which possess good fastness to wet treatments.

*Example 25*

Cotton cloth is padded through an aqueous solution containing 2% by weight of the trisodium salt of 6-(4''-chloro-3''-nitrobenzene sulphon)-methylamido - 1 - hydroxy-2:2' - azonaphthalene-1':3:5' - trisulphonic acid, dried and then padded through an aqueous solution containing 1% by weight of caustic soda and 30% by weight of sodium chloride. The cloth is then steamed for 5 minutes and scoured at the boil in soap solution to remove unfixed dyestuff.

An orange dyeing of excellent fastness to washing and to light is obtained.

*Example 26*

Viscose rayon cloth is padded through an aqueous solution containing 2% by weight of the trisodium salt of 6-(4''-chloro-3'':5''-dinitrobenzenesulphon)methylamido-1-hydroxy-2:2'-azonaphthalene-1':3:5' - trisulphonic acid and 1% by weight of sodium bicarbonate. The cloth is dried, steamed for 5 minutes and scoured at the boil in soap solution to remove unfixed dyestuff.

An orange dyeing of excellent fastness to washing is obtained.

Example 27

A printing paste containing 1 part of the dyestuff used in Example 26, 35 parts of a 5% aqueous solution of sodium alginate, 1 part of sodium bicarbonate and 5 parts of urea in 58 parts of water is applied to cotton fabric by roller and the fabric is dried, steamed for 1 minute then scoured in boiling soap solution to remove unfixed dyestuff.

An orange and white pattern is obtained in which the coloured portion is fast to washing and to light.

What we claim is:

1. Dyestuffs of the formula:

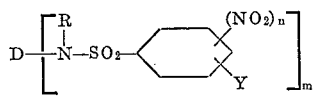

wherein:

D is a chromophoric group selected from the class consisting of azo, anthraquinone, and phthalocyanine chromophoric groups;

R represents a member selected from the class consisting of hydrogen and lower alkyl;

Y represents a halogen atom selected from the class consisting of chlorine, and bromine; the $-NH-SO_2-$ and $-NO_2$ groups are attached to the benzene ring at the positions ortho and para to the halogen atom represented by Y;

$m$ is one of the numbers 1 and 2;

and $n$ is one of the numbers 1 and 2.

2. Dyestuffs according to claim 1, wherein D contains a water-solubilizing group selected from the class consisting of sulfonamido and sulfonic acid radicals.

References Cited in the file of this patent

UNITED STATES PATENTS

| | | |
|---|---|---|
| 2,023,591 | Hitch et al. | Dec. 10, 1935 |
| 2,150,787 | Schultis et al. | Mar. 14, 1939 |
| 2,254,602 | Fleischhauer et al. | Sept. 2, 1941 |
| 2,714,590 | Frisch et al. | Aug. 2, 1955 |
| 2,906,747 | Wolfrum | Sept. 29, 1959 |
| 2,957,863 | Wolfrum et al. | Oct. 25, 1960 |
| 2,959,582 | Schimmelschmidt et al. | Nov. 8, 1960 |
| 2,973,351 | Montmollin et al. | Feb. 28, 1961 |
| 2,993,885 | Fasciati | July 25, 1961 |

FOREIGN PATENTS

| | | |
|---|---|---|
| 278,422 | Germany | Jan. 7, 1928 |
| 338,672 | Great Britain | Nov. 27, 1930 |
| 705,779 | Germany | May 9, 1941 |

OTHER REFERENCES

Conant & Blatt, "The Chem. of Org. Comp.," 4th edition, The MacMillan Co., pp. 136–137.